United States Patent
Hollis et al.

[15] 3,692,844
[45] Sept. 19, 1972

[54] PROCESS FOR PREPARING A TERPENE PHENOLIC CONDENSATION PRODUCT

[72] Inventors: Samuel D. Hollis, Pleasant Hills, Pa.; Philip E. Winston, Jr., Union, N.J.

[73] Assignee: Pennsylvania Industrial Chemical Corporation

[22] Filed: June 24, 1968

[21] Appl. No.: 739,179

[52] U.S. Cl. ..........................260/619 D, 260/624 C
[51] Int. Cl. .......C07c 37/14, C07c 39/16, C07c 3/18
[58] Field of Search ...260/619 D, 621, 624 A, 624 C

[56] References Cited

UNITED STATES PATENTS 2,343,845   3/1944   Powers ..................260/619 X
2,596,235   5/1952   Geiger ...................260/619 X Primary Examiner—Leon Zitver
Assistant Examiner—Norman Morgenstern
Attorney—Buell, Blenko & Ziesenheim

[57] ABSTRACT

A continuous process for preparing a terpene phenolic compound by alkylating phenol with a cyclic terpene in the presence of boron trifluoride, withdrawing a resinous product characterized by its high phenol reactivity and recycling the distilled boron trifluoride and excess phenol.

2 Claims, No Drawings

PROCESS FOR PREPARING A TERPENE PHENOLIC CONDENSATION PRODUCT

This invention relates to a continuous process for preparing a synthetic resinous product from a terpene and a phenol which product is characterized by its high phenol reactivity. This product (referred to hereinafter as a "terpene phenolic compound") is useful in many chemical reactions and industrial processes where bisphenols are used; particularly in our process for preparing terpene epoxy resin esters as described in our co-pending application, Ser. No. 739,189, filed June 24, 1968, now U.S. Pat. No. 3,594,340, issued July 20, 1971.

In referring to "high phenol reactivity," we mean that the substance furnishes a phenol structure in unhindered form; more specifically, that the hydroxyl group and the various positions on the phenol ring are available for reaction.

At present, it is common practice to prepare useful phenolic compounds known as bisphenols by reacting phenol with ketones, aldehydes, dihalides, terpenes and diolefins in the presence of a catalyst. The catalysts most commonly used are acid catalysts such as sulphuric acid, phosphoric acid, acid-treated clay, hydrogen chloride, zinc chloride, boron trifluoride and the like. These catalysts must be neutralized with alkaline substances such as lime, ammonia, sodium hydroxide and the like. The neutralization reaction results in the formation of salts which must be removed either by water wash or filtration. Filtration is disadvantageous because it is time consuming and requires a second vessel to receive the filtered product. The salt cake produced by the filtration operation is usually phenol laden and elaborate disposal procedures are often required.

Frequently organic solvents are used to moderate the initial reaction of phenol with the compounds described above or to dissolve the product of the reaction. The reaction product must then be separated from the solvent by crystallization, filtration, distillation and the like. The recovered solvent must be purified to some extent to permit re-use and frequently the solvent-wet product must be dried free of solvent.

We have discovered process for producing a phenolic product having high phenol reactivity which process overcomes the disadvantages described above. In our process, no water or hydrogen halides are evolved and no catalyst salts are produced requiring water wash or filtration. Solvents are not used at any stage of the process of our invention. Moreover, our process is readily adaptable to continuous operation because no by-products are produced. The catalyst is continuously recovered and high production rates are attainable with excellent product uniformity.

We provide a process for producing a terpene phenolic compound characterized by its high phenol reactivity comprising reacting a mixture of terpene and phenol in the presence of boron trifluoride, distilling the unreacted phenol and the boron trifluoride from the reaction mixture while withdrawing a resinous product from said reaction mixture and recycling said distilled phenol and boron trifluoride.

In the process of our invention, we prefer to admix at least one terpene selected from the group consisting of alpha-pinene, beta-pinene, $\Delta^3$ carene and turpentine with a solution of boron trifluoride in phenol to form a reaction mixture. The well known reaction which ensues in this admixture is the alkylation of the phenol by the terpene. Preferably the charging ratio of moles of phenol to moles of terpene is at least 2.0 to 1 and the concentration of boron trifluoride is in the range of 0.05 to 1.5 percent by weight of the terpene utilized. We prefer to maintain the temperature of the reaction mixture in the range of about 50° to 130° C. during alkylation.

In the practice of our invention, an unsaturated terpene containing a cyclobutane or cyclopropane ring is added to an agitated solution of boron trifluoride in phenol while maintaining the temperature of the reaction mixture in the range of 50° to 130° C. If the reaction is carried out at temperatures significantly below 50° C., undesirable phenolic ethers are formed; and similarly, if the reaction temperature exceeds 130° C., the product of the reaction becomes dark in color. The terpene material used must be any one or a combination selected from the group consisting of alpha-pinene, beta-pinene, $\Delta^3$ carene and turpentine.

We have discovered that when excess phenol is used, it can be distilled from the product and recovered along with the boron trifluoride catalyst. Accordingly, upon the completion of the first addition of the prescribed terpene or terpenes while maintaining the temperature range described above, the reaction mixture is passed to a fractionating column. There the reaction mixture may be heated under reduced pressure to cause the unreacted phenol to distill over, carrying with it all of the boron trifluoride catalyst. Part of the boron trifluoride will condense with the phenol. The remainder can be recovered by bubbling it into fresh phenol in the trap of the vacuum system. Boron trifluoride removal is extremely effective by this technique. It has been found that no trace of the boron trifluoride remains in the product and this represents a material advantage since traces of boron trifluoride could affect subsequent chemical reactions in which the terpene phenolic compound is used.

We have found that a charging ratio of at least 2.0 to 1.0 moles of phenol to moles of terpene is required to operate the process on a continuous basis. Charging ratios below 2.0 to 1.0 result in the formation of by-product oils and the like which accumulate as contaminating substances and are not recyclable. The presence of these by-products interferes with the continuity of the process. Some monoalkylates and terpene phenol ethers distill over with the phenol but they rearrange and react to form normal product when recycled with the phenol.

The preferred concentration of boron trifluoride catalyst is in the range of 0.05 to 1.5 percent based on the weight of terpene utilized. It has been found that an increase in the catalyst concentration within the range specified results in an increase in the phenol reactivity of the product. Thus it is a feature of the invention that the phenol reactivity in the product can be adjusted with excellent reproducibility.

The behavior of the particular terpenes— alpha-pinene, beta-pinene, $\Delta^3$ carene and turpentine — specified for use in our invention is unique. Other terpenes and olefines react readily with phenol in the presence of boron trifluoride and the excess phenol and boron trifluoride can be recovered by distillation as is well known, but the phenolic compounds produced do not have the high phenol reactivity exhibited by the product of the present invention. Table I below illustrates the phenol reactivity of the terpene phenolic compound produced in accordance with the invention compared with the phenol reactivity of other alkylephenols. The commonly accepted formaldehyde reactivity was measured wherein 600 grams of each material was reacted with formaldehyde in the presence of 1.0 percent oxalic acid (dihydrate) catalyst and the softening points recorded at various levels of formaldehyde consumed. The combining ratio (in moles) of phenol to each of the alkyl groups identified in Table I was 1:1 in all cases.

The terpene phenolic compounds produced in accordance with the invention have ring and ball softening points ranging from 30° to 110° C. depending upon the reaction conditions selected. They are pale in color and soluble in methanol. These compounds are of particular value because of the enhanced reactivity which they display with chemicals which react with phenol.

TABLE I

VARIATION OF PHENOLIC RESIN SOFTENING POINT WITH MOLS OF FORMALDEHYDE CONSUMED PER MOL OF PHENOL

| Mols Formaldehyde Consumed | Para-Isooctyl phenol | Para-teritiary butyl phenol | Terpene phenol |
|---|---|---|---|
| 0.050 | | | 90°C |
| 0.125 | 27°C | | 105°C |
| 0.200 | | 28°C | 122°C |
| 0.250 | 40°C | | 135°C |
| 0.300 | | 38°C | 147°C |
| 0.350 | | | 160°C |
| 0.400 | | | gell |
| 0.450 | 62°C | 60°C | gell |
| 0.500 | | | gell |
| 0.700 | 85°C | | gell |
| 0.750 | | 80°C | gell |
| 0.800 | | | gell |
| 0.850 | | | gell |
| 0.900 | 96°C | | gell |

Formaldehyde will react with these compounds to form high softening point, high solution viscosity resins which are useful in preparing varnishes and lacquers because of their desirable solubility characteristics, pale color and good color retention.

The following example will serve to illustrate the practice of our invention. The example is not intended to limit the invention, however, for there are numerous possible variations and modifications.

EXAMPLE I

Alpha-pinene was added to phenol-BF$_3$ mixture while maintaining good agitation and controlling the reaction temperature at 55° C. with a cold water bath. The rate of addition was adjusted so that all the alpha-pinene was added in a period of 1-½ to 2 hours. The pressure was then reduced to 50 mm Hg., the batch heated until smooth distillation of phenol-BF$_3$ mixture commenced, then heated on up to 250° C. to insure complete removal of phenol-BF$_3$. The batch was then cooled to 200° C. under N$_2$ gas and poured. The phenol-BF$_3$ mixture collected was recycled to the next preparation, mixed with fresh phenol and charged with sufficient BF$_3$ gas to compensate for that lost during distillation. The entire procedure was then repeated a number of times as outlined in the table below: to ascertain the behavior of the BF$_3$ and phenol when recycled.

| Run No. | Fresh phenol (grams) | BF$_3$ (grams) | Alpha pinene (grams) | Recycle phenol (grams) | Product (grams) | Product softening point (°C.) | Conversion (percent) |
|---|---|---|---|---|---|---|---|
| 1 | 442 | 0.6 | 202 | None | 344 | 107 | 53.5 |
| 2 | 123 | 0.3 | 186 | 288 | 317 | 105 | 53.2 |
| 3 | 130 | 0.3 | 190 | 277 | 327 | 103 | 54.7 |
| 4 | 147 | 0.3 | 195 | 273 | 345 | 102 | 56.2 |
| 5 | 136 | 0.3 | 192 | 270 | 327 | 104 | 54.7 |
| 6 | 138 | 0.3 | 192 | 270 | 315 | 107 | 52.5 |

This series of runs produced 1943 g. of terpene phenolic product with a yield of 98.6 percent.

While we have described a present preferred method it is to be distinctly understood that the invention is not limited thereto but may be otherwise variously practiced within the scope of the following claims.

We claim:

1. A process for producing a reactive terpene phenolic compound characterized by its high phenol reactivity comprising the steps of
   a. admixing at least one terpene selected from the group consisting of alpha-pinene, beta-pinene, $\Delta^3$ carene and turpentine with a solution of boron trifluoride in phenol wherein the ratio of moles of phenol to moles of terpene is at least 2.0 to 1.0 to form a reaction mixture;
   b. maintaining the temperature of said reaction mixture in the range of about 50° to 130° C.;
   c. distilling the unreacted portion of the solution of boron trifluoride in phenol from said reaction mixture;
   d. withdrawing a resinuous product from said reaction mixture; and
   e. recycling the distilled solution of boron trifluoride in phenol.

2. A process as recited in claim 1 in which the concentration of boron trifluoride is in the range of 0.05 to 1.5 percent by weight of the terpene utilized.

* * * * *